United States Patent Office 2,989,410
Patented June 20, 1961

2,989,410
ALL SKIN VISCOSE RAYON AND METHOD
OF PREPARING SAME
Byron A. Thumm, Swarthmore, Pa., assignor to American Viscose Corporation, Philadelphia, Pa., a corporation of Delaware
No Drawing. Original application June 29, 1955, Ser. No. 518,933. Divided and this application July 26, 1957, Ser. No. 674,293
2 Claims. (Cl. 106—165)

This invention relates to the production of shaped bodies of regenerated cellulose from viscose and more particularly to filaments and fibers of regenerated cellulose from viscose.

In the conventional methods of producing shaped bodies of regenerated cellulose from viscose, a suitable cellulosic material such as purified cotton linters, wood pulp, mixtures thereof, and the like is first converted to an alkali cellulose by treatment with a caustic soda solution and after shredding the treated cellulose material, it is allowed to age. The aged alkali cellulose is then converted to a xanthate by treatment with carbon disulfide. The cellulose xanthate is subsequently dissolved in a caustic soda solution in an amount calculated to provide a viscose of the desired cellulose and alkali content. After filtration, the viscose solution is allowed to ripen and is subsequently extruded through a shaped orifice into a suitable coagulating and regenerating bath.

In the production of shaped bodies such as filaments, the viscose solution is extruded through a spinneret into a coagulating and regenerating bath consisting of an aqueous acid solution containing zinc sulfate. The filament may subsequently be passed through a hot aqueous bath where it is stretched to improve its properties such as tensile strength. The filament may then be passed through a dilute aqueous solution of sulfuric acid and sodium sulfate to complete the regeneration of the cellulose, in case it is not completely regenerated upon leaving the stretching stage. The filament is subsequently subjected to washing, purification, bleaching, possibly other treating operations and drying, being collected either before or after these treatments.

The filaments as formed by the conventional methods, consist of a skin or outer shell portion and a core portion with a sharp line of demarkation between the two. The cross-section of the filaments exhibits a very irregular or crenulated exterior surface when even small amounts of zinc salts or certain other polyvalent metal salts are present in the spinning bath. The skin and more portions of the filament represent differences in structure and these different portions possess different swelling and staining characteristics, the latter permitting a ready identification of skin and core. The sharply irregular and crenulated surface structure has a realtively low abrasion resistance and readily picks up foreign particles such as dirt. Although the core portion possesses a relatively high tensile strength, it has a low abrasion resistance and a low flex-life, is subject to fibrillation and is relatively stiff.

In the copending application of Carl A. Castellan, Serial No. 381,468, filed September 21, 1953, now U.S. Patent No. 2,792,281, there is disclosed the use of di-N,B-hydroxyethyl ethylene diamine for improving the properties and characteristics of shaped bodies of regenerated cellulose. This substance may be considered as an ethylene oxide adduct of ethylene diamine containing 4 ethylene oxide units per molecule of ethylene diamine where theoretically one ethylene oxide unit has reacted with each of the amino hydrogen atoms to form a hydroxyethyl group or radical.

In the copending application of Marion R. Lytton, Serial No. 478,938, filed December 30, 1954, which has been abandoned in favor of application Serial No. 807,298, filed April 20, 1959, there is disclosed the use of ethylene oxide adducts of ethylene diamine containing at least 28 ethylene oxide units per molecule of ethylene diamine for improving the properties and characteristics of shaped bodies of regenerated cellulose. These substances may be considered as adducts where, theoretically, polyoxyethylene groups or chains having at least 7 ethylene oxide units have reacted with each of the amino hydrogens.

It has now been discovered that the presence of small amounts of ethylene diamine in viscose results in the production of shaped bodies of regenerated cellulose such as filaments, films, sheets and the like composed of all skin and having improved properties and characteristics providing that the amount of the modifying agent is maintained within certain limits and the composition of the spinning bath is maintained within certain composition limits which will be defined hereinafter. The most readily distinguishable characteristics as compared to conventional filaments include a smooth, non-crenulated surface and the filaments consist entirely of skin.

The amount of ethylene diamine which is incorporated in the viscose must be at least about 0.25% by weight of the cellulose in the viscose and may vary up to about 2.5%, preferably, the amount varies from about 0.5% to 1%. Lesser amounts do not result in the production of products consisting entirely of skin and greater amounts affect adversely the physical properties of the products partly because of rapid lowering of the salt test. Amounts within the preferred range are most effective in enhancing the characteristics and properties of the products. The ethylene diamine may be added at any desired stage in the production of the viscose such as in the preparation of the refined wood pulp for the manufacture of viscose, before or during the shredding of the alkali cellulose, to the xanthated cellulose while it is being dissolved in the caustic solution or to the viscose solution before or after filtration. The ethylene diamine is preferably added after the cellulose xanthate has been dissolved in the caustic solution and prior to filtration.

The viscose may contain from about 6% to about 8% cellulose, the particular source of the cellulose being selected for the ultimate use of the regenerated cellulose product. The caustic soda content may be from about 4% to about 8% and the carbon disulfide content may be from about 30% to about 50% based upon the weight of the cellulose. The modified viscose, that is, a viscose containing the small amount of ethylene diamine should have a salt test above about 7 and preferably above about 8 at the time of spinning or extrusion.

In order to obtain the improvements enumerated hereinbefore, it is essential that the composition of the spinning bath be maintained within a well defined range. The presence of ethylene diamine in the viscose combined with these limited spinning baths results in the production of yarns of improved properties such as high abrasion resistance, high fatigue resistance and consisting of filaments composed entirely of skin.

Generically and in terms of the industrial art, the spinning bath is a low acid-high zinc spinning bath containing from about 10% to about 25% sodium sulfate and from about 3% to about 15% zinc sulfate, preferably from 15% to 22% sodium sulfate and from 4% to 9% zinc sulfate. Other metal sulfates such as iron, manganese, nickel and the like may be present and may replace some of the zinc sulfate. The temperature of the spinning bath may vary from about 25° C. to about 80° C., preferably between about 45° C. and about 70° C. As is well known in the conventional practice in the art, certain of the physical properties such as tensile strength vary directly with the temperature of the spinning bath. Thus, in the production of filaments for tire cord purposes in accordance with the method of this invention, the spinning bath is preferably maintained at a temperature between about 55° C. and 65° C. so as to obtain the desired high tensile strength.

The acid content of the spinning bath is balanced against the composition of the viscose. The lower limit of the acid concentration, as is well known in the art, is just above the slubbing point, that is, the concentration at which small slubs of uncoagulated viscose appear in the strand as it leaves the spinning bath. For commercial operations, the acid concentration of the spinning bath is generally maintained about 0.4% to 0.5% above the slubbing point. For any specific viscose composition, the acid concentration of the spinning bath must be maintained above the slubbing point and below the point at which the neutralization of the caustic of the viscose is sufficiently rapid to form a filament having a skin and core.

There is a maximum acid concentration for any specific viscose composition beyond which the neutralization is sufficiently rapid to produce filaments having a skin and core. For example, in general, the acid concentration of the spinning baths which are satisfactory for the production of the all skin products from a 7% cellulose, 6% caustic-viscose and containing ethylene diamine lies between about 6% and about 8%. The acid concentration may be increased as the amount of ethylene diamine is increased and also as the salt test of the viscose is increased. There is an upper limit, however, for the acid concentration based upon the amount of ethylene diamine and the concentration of caustic in the viscose. All skin products cannot be obtained if the acid concentration is increased above the maximum value although the amount of ethylene diamine is increased beyond about 2.5% while other conditions are maintained constant. For example, a viscose containing about 7% cellulose, about 6.5% caustic soda, about 36% (based on the weight of cellulose) carbon disulfide, and 1% (based on the weight of cellulose) of ethylene diamine and having a salt test of about 9.5 when extruded into spinning baths containing 16 to 20% sodium sulfate,, 4 to 8% zinc sulfate and sulfuric acid not more than about 8.3% results in the production of all skin filaments. Lesser amounts of sulfuric acid may be employed. Greater amounts of sulfuric acid result in the production of products having skin and core. A lowering of the amount of the ethylene diamine, the lowering of the caustic soda content or the lowering of the salt test of the viscose reduces the maximum permissible acid concentration for the production of all skin filaments. The maximum concentration of acid which is permissible for the production of all skin products is about 8.5%.

The presence of ethylene diamine in the viscose retards the coagulation and, therefore, the amount of ethylene diamine employed must be reduced at high spinning speeds. Thus, for optimum physical characteristics of an all skin yarn formed from a viscose as above and at a spinning speed of about 50 meters per minute, the ethylene diamine is employed in amounts within the lower portion of the range, for example, about 0.4% to 0.7%. The determination of the specific maximum and optimum concentration of acid for any specific viscose, spinning bath and spinning speed is a matter of simple experimentation for those skilled in the art. The extruded viscose must, of course, be immersed or maintained in the spinning bath for a period sufficient to effect relatively complete coagulation of the viscose, that is, the coagulation must be sufficient so that the filaments will not adhere to each other as they are brought together and withdrawn from the bath.

In the production of filaments for such purposes as the fabrication of tire cord, the filaments are preferably stretched after removal from the initial coagulating and regenerating bath. From the initial spinning bath, the filaments may be passed through a hot aqueous bath which may consist of hot water or a dilute acid solution and may be stretched from about 70% to about 120%, preferably between 80% and 100%. Yarns for other textile purposes may be stretched as low as 20%. The precise amount of stretching will be dependent upon the desired tenacity and other properties and the specific type of product being produced. If desired, the filaments may be stretched in air. It is to be understood that the invention is not restricted to the production of filaments and yarns but it is also applicable to other shaped bodies such as sheets, films, tubes and the like. The filaments may then be passed through a final regenerating bath which may contain from about 1% to about 5% sulfuric acid and from about 1% to about 5% sodium sulfate with or without small amounts of zinc sulfate if regeneration has not previously been completed.

The treatment following the final regenerating bath, or the stretching operation where regeneration has been completed, may consist of a washing step, a desulfurizing step, the application of a finishing or plasticizing material and drying before or after collecting, or may include other desired and conventional steps such as bleaching and the like. The treatment after regeneration will be dictated by the specific type of shaped body and the proposed use thereof.

Regenerated cellulose filaments prepared from viscose containing the small amounts of ethylene diamine and spun in the spinning baths of limited acid content have a smooth or non-crenulated surface and consist substantially entirely of skin. Because of the uniformity of structure throughout the filament, the swelling and staining characteristics are uniform throughout the cross-section of the filament. Filaments produced pursuant to this invention and consisting entirely of skin have a high toughness and a greater flexing life than filaments as produced according to prior methods which may be attributed by the uniformity in skin structure throughout the filament. Although the twisting of conventional filaments, as in the production of tire cord, results in an appreciable loss of tensile strength, there is appreciably less loss in tensile strength in the production of twisted cords from the filaments consisting entirely of skin. Filaments prepared from viscose containing ethylene diamine have a superior abrasion and fatigue resistance characteristics and have a high flex-life. Such filaments are highly satisfactory for the production of cords for the reinforcement of rubber products such as pneumatic tire casings, but the filaments are not restricted to such uses and may be used for other textile applications.

The invention may be illustrated by reference to the preparation of regenerated cellulose filaments from a viscose containing about 7.4% cellulose, about 6.6% caustic soda, and having a total carbon disulfide content of about 36% based on the weight of the cellulose. The viscose solutions were prepared by xanthating alkali cellulose by the introduction of 36% carbon disulfide based on the weight of the cellulose and churning for about 2½ hours. The cellulose xanthate was then dissolved in caustic soda solution. The desired amount of ethylene diamine was added to the solution and mixed for about ½ hour. The viscose was then allowed to ripen for about 30 hours at 18° C.

*Example 1*

Approximately 0.5% ethylene diamine (based on the weight of the cellulose) was added to and incorporated in the viscose as described above. The viscose employed in the spinning of filaments had a salt test of 8.7. The viscose was extruded through a spinneret to form a 210 denier, 100 filament yarn at a rate of about 22 meters per minute. The coagulating and regenerating bath was maintained at a temperature of about 60° C. and contained 8.2% sulfuric acid, 5% zinc sulfate and 19% sodium sulfate. The yarn was stretched about 82% while passing through a hot water bath at 95° C. The yarn was collected in a spinning box, washed free of acids and salts and dried.

The individual filaments have a smooth, non-crenulated exterior surface and consist entirely of skin, no core being detectable at high magnification (e.g. 1500×). The filaments of a control yarn spun with the same viscose but without the addition of the modified agent and spun under the same conditions, exhibit a very irregular and serrated surface and are composed of about 65% skin and the balance core with a sharp line of demarkation between the skin and core. Other physical properties are set forth in the table which follows the examples.

Example 2

As a control for the foregoing example, a viscose solution, prepared as described above but without the addition of ethylene diamine and having a salt test of 10, was spun into a 205 denier, 100 filament yarn by extrusion into a bath containing 8.3% sulfuric acid, 5% zinc sulfate and 19% sodium sulfate. The bath was maintained at a temperature of about 60° C. and the extrusion rate was about 22 meters per minute. The water bath was maintained at a temperature of about 95° C. and the filaments were stretched about 82% while passing through the hot water. The yarn was collected in a spinning box, washed free of acids and salts and dried.

The individual filaments have a very irregular and serrated surface and consist of about 65% skin and the balance core with a sharp line of demarkation between the skin and the core. Other characteristics are set forth in the table which follows the examples.

Example 3

To a viscose solution as described above there was added about 0.5% ethylene diamine (based on the weight of the cellulose). The viscose had a salt test of 7.1 and was spun into a 205 denier, 100 filament yarn at an extrusion rate of about 22 meters per minute. The coagulating and regenerating bath was maintained at 60° C. and contained 7.4% sulfuric acid, 5% zinc sulfate and 21% sodium sulfate. The yarn was passed through a hot water bath maintained at about 95° C. and was stretched about 82% while passing through the bath. The yarn was collected in a spinning box, washed free of acids and salts and dried.

The individual filaments have a smooth, non-crenulated exterior surface and consist entirely of skin, no core being detectable at high magnification (e.g. 1500×). The filaments of a control yarn spun with the same viscose but without the addition of the modified agent and spun under the same conditions, exhibit a very irregular and serrated surface and are composed of about 75% skin and the balance core with a sharp line of demarkation between the skin and core. Other physical properties are set forth in the table which follows the examples.

Example 4

To a viscose as described above, there was added 1% ethylene diamine. The viscose had a salt test of 6.6 and was spun into a 205 denier, 100 filament yarn by extrusion into a spinning bath having the same composition as that of Example 3 and the spinning, stretching and washing conditions were identical to those of Example 3. The yarn was collected in a spinning box, washed free of acids and salts and dried.

The individual filaments were readily distinguishable from control filaments in that they have a smooth, non-crenulated surface and consist of between about 95% and 100% skin while control filaments have a very irregular and serrated surface and consist of about 75% skin and the balance core with a sharp line of demarkation between the skin and core. Other physical properties are set forth in the table which follows the examples.

This example illustrates the close relationship between the modifier content of the viscose, the salt test and the acid concentration of the spinning bath. Although the filaments have the advantage of a smooth, non-crenulated surface as compared to control filaments, the acid content of the spinning bath was too high to effect the slower rate of neutralization of the caustic of the viscose necessary to produce the all skin filaments although an all skin structure was approached. In order to form all skin filaments from the viscose of this example, it would be necessary to reduce the acid content of the spinning bath to about 7% sulfuric acid or to spin the viscose at a higher salt test. For commercial practice, the reduction in acid content would not be desired and the viscose would be spun at a higher salt test.

Example 5

As a control for Examples 3 and 4, a viscose solution prepared as described above, having a salt test of 7 was spun into a 205 denier, 100 filament yarn by extrusion into a bath containing 7.7% sulfuric acid, 5% zinc sulfate and 21% sodium sulfate. The bath was maintained at a temperature of about 60° C. The extrusion rate was about 22 meters per minute. The water bath was maintained at a temperature of about 95° C. and the filaments were stretched 82% while passing through the hot water. The yarn was collected in a spinning box, washed free of acid and salts and dried.

The individual filaments have a very irregular and serrated surface and consist of about 75% skin and the balance core with a sharp line of demarkation between the skin and the core. Other characteristics are set forth in the table which follows:

|  | Tenacity, Grams per denier | | Elongation, percent | | Skin, percent |
| --- | --- | --- | --- | --- | --- |
|  | Wet | Dry | Wet | Dry |  |
| Example 1 | 2.3 | 3.2 | 25 | 20 | 100 |
| Example 2 (Control) | 2.3 | 3.1 | 27 | 20 | 65 |
| Example 3 | 2.4 | 3.3 | 25 | 20 | 100 |
| Example 4 | 2.2 | 3.1 | 23 | 19 | 95–100 |
| Example 5 (Control) | 2.4 | 3.3 | 27 | 21 | 75 |

Although the tenacity and elongation are the only properties set forth, they have been chosen because of the ease and simplicity with which such properties may be determined. In some instances, products made in accordance with this invention do not exhibit improvements in tenacity and elongation, however, the products consist of a smooth-surfaced, all skin structure and possess improved abrasion resistance, flex-life and other properties as disclosed hereinbefore.

One of the properties of viscose rayon which has limited its uses is its relatively high cross-sectional swelling when wet with water, this swelling amounting to from about 65% to about 80% for rayon produced by conventional methods. Rayon filaments produced in accordance with the method of this invention have an appreciably lower cross-sectional swelling characteristic, the swelling amounting to from about 45% to about 60%.

The ethylene diamine may be added to any desired viscose such as those normally used in industry, the specific viscose composition set forth above, being merely for illustrative purposes. The ethylene diamine may be added at any desired stage in the production of the viscose and may be present in the cellulosic raw material although it may be necessary to adjust the amount present to produce a viscose having the proper proportions of ethylene diamine at the time of spinning.

The term skin is employed to designate that portion of regenerated cellulose filaments which is permanently stained or dyed by the following procedure: a microtome section of one or more of the filaments mounted in a wax block is taken and mounted on a slide with Meyer's albumin fixative. After dewaxing in xylene, the section is placed in successive baths of 60% and 30% alcohol for a few moments each, and it is then stained in 2% aqueous solution of Victoria Blue BS conc. (General Dyestuffs Corp.) for 1 to 2 hours. At this point, the entire section is blue. By rinsing the section first in distilled water and then in one or more baths composed of 10% water and 90% dioxane for a period varying from 5 to 30 minutes depending on the particular filament, the dye is entirely removed from the core, leaving it restricted to the skin areas.

This application is a division of my copending application Serial No. 518,933, filed June 29, 1955.

While preferred embodiments of the invention have been disclosed, the description is intended to be illustrative and it is to be understood that changes and variations may be made without departing from the spirit and scope of the invention as defined by the appended claims.

I claim:

1. A viscose spinning solution containing from about 0.25% to about 2.5%, based on the weight of the cellulose in the viscose, of ethylene diamine.

2. A viscose spinning solution containing from about 0.25% to about 2.5%, based on the weight of the cellulose in the viscose, of ethylene diamine and having a sodium chloride salt test of at least 7.

References Cited in the file of this patent

UNITED STATES PATENTS

| | | |
|---|---|---|
| 2,373,712 | Schlosser et al. | Apr. 17, 1945 |
| 2,535,044 | Cox | Dec. 26, 1950 |
| 2,593,466 | MacLaurin et al. | Apr. 22, 1952 |